E. G. SMITH.
TERMINAL BOX.
APPLICATION FILED JAN. 9, 1914.
1,213,287.
Patented Jan. 23, 1917.
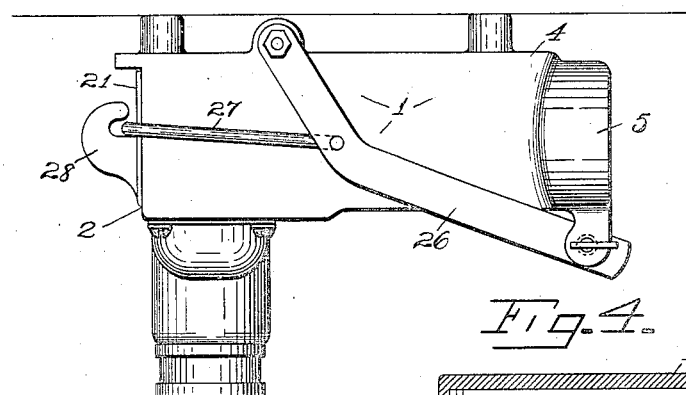
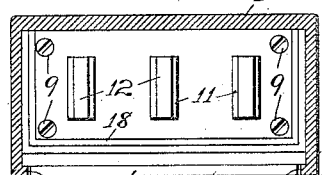
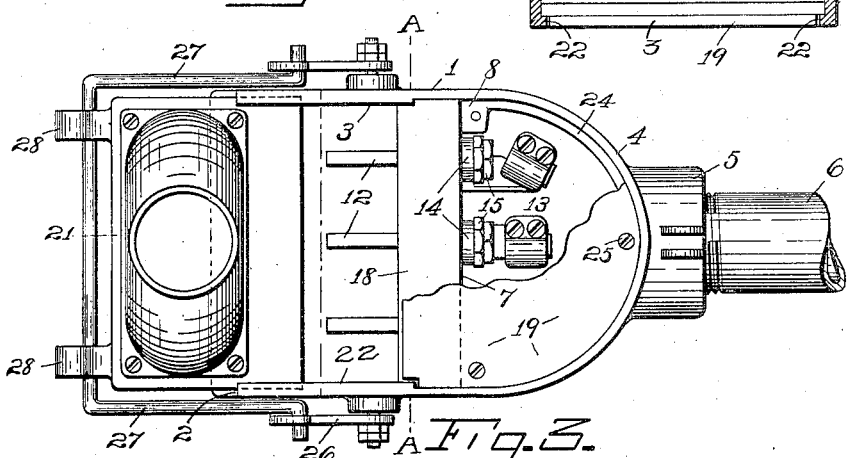
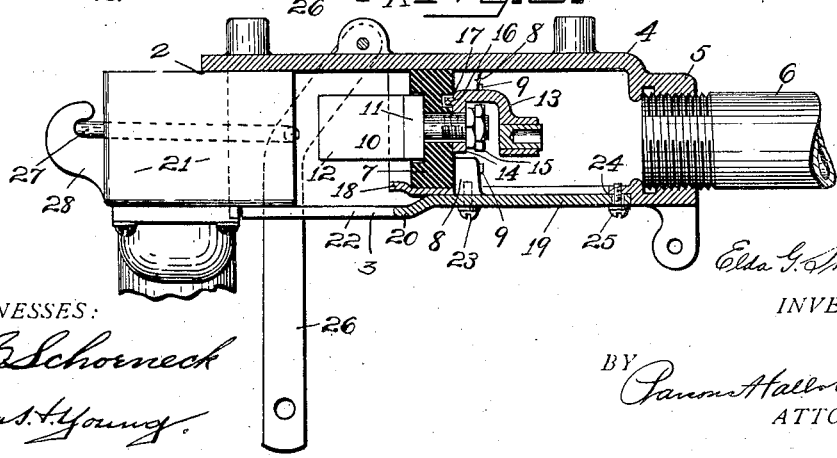
WITNESSES:
CCSchorneck
Chas H. Young
Elda G. Smith,
INVENTOR.
BY Parson Hall Bodell
ATTORNEYS.

UNITED STATES PATENT OFFICE.

ELDA G. SMITH, OF SYRACUSE, NEW YORK, ASSIGNOR TO CROUSE-HINDS COMPANY, OF SYRACUSE, NEW YORK, A CORPORATION OF NEW YORK.

TERMINAL BOX.

1,213,287.	Specification of Letters Patent.	Patented Jan. 23, 1917.

Application filed January 9, 1914. Serial No. 811,181.

*To all whom it may concern:*

Be it known that I, ELDA G. SMITH, a citizen of the United States, and a resident of Syracuse, in the county of Onondaga and State of New York, have invented a certain new and useful Terminal Box, of which the following is a specification.

This invention has for its object the production of an electrical terminal box or connection, particularly applicable to be used in connection with electric conduits and to house terminals which are connected to the wires in the electric conduits, and which have contacts exposed in position to be engaged by the terminals of the plug movable into the box; and the invention consists in the novel features of construction hereinafter set forth and claimed.

In describing this invention, reference is had to the accompanying drawings in which like characters designate corresponding parts in all the views.

Figure 1 is an elevation of a terminal box embodying my invention, the plug being shown as located in the box. Fig. 2 is an inverted plan of parts seen in Fig. 1, the plug being shown as shifted partly out of the box. Fig. 3 is a longitudinal sectional view, taken centrally of Fig. 2. Fig. 4 is a cross-sectional view on line A—A, Fig. 2.

1 is the box which is rectangular in general outline, being open at 2 at its front end and at one side 3, the box having its other or rear end 4 and its other sides closed, the closed end being provided with a nipple 5 for connection with the electric conduit 6 inclosing the wires entering the box 1.

7 is a partition extending transversely of the interior of the box and exposed at one edge at the open side of the box, said partition comprising a block of insulation. The block 7 abuts against projections 8 on the interior of the box 1 in the portion or chamber which communicates with the nipple 5, and screws 9 extend transversely through the partition 7 into the projections 8 and have their heads toward the open end 2 of the box.

10 are terminals supported by the partition 7, these terminals including stems extending transversely through the partition 7, each stem having a head 11 at one end which carries a contact 12 located in the portion of the box which is open at 2, at one end. The terminals also include binding devices 13 mounted on the stems and located in the chamber at the closed end of the box. The binding devices are for connection with the wires leading into the box through the conduit 6 and nipple 5.

Each binding device has a perforated base 14 mounted on the stem, and nuts 15 thread on the stem against said base. In order to prevent the binding devices from turning, their bases 14 are provided with projections 16 which enter recesses as 17 in the partition. Usually, a strip of felt 18 is interposed between the ends of the partition and the sides of the box, the strip also covering the exposed edge of the partition, said strip being for the purpose of forming a tight joint.

19 is a cover for the portion of the box between the partition 7 and the nipple or closed end of the box, the cover lapping the edge of the partition 7 and resting on the strip of felt 18 and extending slightly in front of the partition, that is, toward the open end 2 of the box, the margin of the cover 19 toward the open end 2 of the box being deflected outwardly forming a flange 20 which forms a stop for the plug 21.

The side walls of the box between the partition 7 and the open end 2 of the box are formed with inturned flanges 22 for forming guides for the plug 21, these flanges being alined with the flange 20 of the cover 19. The cover 19 is held in position by screws, two of the screws 23 threading into the projections 8. In order that the cover may tightly fit the box, the box is provided with a depressed ledge 24 on which the margin of the cover rests, and one of said screws as 25 threads into said margin.

The plug 21 is moved into and out of the box by means of a bifurcated lever 26 pivoted to the box and extending on opposite sides thereof, and a bail 27 connected at its opposite ends to the lever 26 and extending around the plug and engaged with hooks 28 on the plug. This feature forms no part of this invention, but forms the subject matter of my pending application, Sr. No. 787,207, filed Oct. 28, 1911, of which this application is for the most part a continuation.

What I claim is:—

1. A terminal box rectangular in general outline and open at one end and at one side and being closed at its other end and other sides, and having a nipple for connection with an electric conduit at its closed end, a partition extending transversely of the interior of the box forming a chamber communicating with the nipple, terminals supported by the partition and having binding devices located in said chamber for connection with wires extending into said chamber from the electric conduit connected to the nipple, said terminals also having contacts exposed on the opposite side of the partition, and a cover for the chamber, substantially as and for the purpose described.

2. A terminal box rectangular in general outline and open at one end and one side and closed at its other end and other sides, the box having a transverse partition having one edge exposed at said open side, a cover for the portion of the open side of the box between the partition and the closed end of the box, the cover overlapping the edge of the partition, and terminals supported by the partition and exposed on opposite sides thereof, substantially as and for the purpose set forth.

3. A terminal box open at one end and one side and closed at its other end and other sides, the box being provided with a transverse partition having an edge exposed at said open side, a cover for the portion of the open side of the box between the partition and the closed end of the box, and terminals supported by the partition and exposed on opposite sides thereof, substantially as and for the purpose set forth.

4. A terminal box rectangular in general outline and having a transverse partition of insulation between its ends and terminals carried by said partition and exposed on opposite sides thereof, a cover for the portion of the open side of the box between the partition and the closed end of the box, the cover overlapping the edge of the partition and extending in front of the partition toward the open end of the box to form a stop; in combination with a plug movable in and out of the box and into and out of engagement with the stop, substantially as and for the purpose specified.

5. A terminal box rectangular in general outline and open at its front end and at one side and being closed at its other end and the other sides and having a nipple for connection with an electric conduit at its closed end, a partition extending transversely of the interior of the box between its ends forming a chamber communicating with the nipple, terminals supported by the partition and having binding devices located in said chamber for connection with wires extending into said chamber from the electric conduit connected to the nipple, said terminals also having contacts exposed on the opposite or front side of the partition, and a cover for the chamber, the cover extending in front of the partition; in combination with a plug movable into the box through the open side thereof against the front edge of the cover, substantially as and for the purpose set forth.

6. A terminal box rectangular in general outline, open at its front end and at one side and being closed at its other end and other sides and having means for connection with an electric conduit at its closed end, a partition extending transversely of the interior of the box between its ends forming a chamber communicating with the nipple, terminals supported by the partition and having binding devices located in said chamber for connection with wires extending into the chamber from the electric conduit connected to the box, the terminals also having contacts exposed on the front side of the partition toward the open end of the box, and a cover for the chamber, the cover overlapping the edge of the partition and extending in advance of the partition toward the open end of the box forming a stop, and the portion of the side walls of the box in front of the partition having their free margins inturned and alined with the front edge of the cover; in combination with a plug movable in the box through the open side thereof along said inturned margins against said stop, substantially as and for the purpose described.

In testimony whereof, I have hereunto signed my name in the presence of two attesting witnesses, at Syracuse, in the county of Onondaga, in the State of New York, this 22nd day of December 1913.

ELDA G. SMITH.

Witnesses:
C. C. SCHOENECK,
K. KIMMAN.